Nov. 24, 1959  H. L. G. RICOUARD  2,914,127
APPARATUS FOR WALKING HEAVY EQUIPMENT
Filed Aug. 8, 1955  7 Sheets-Sheet 1
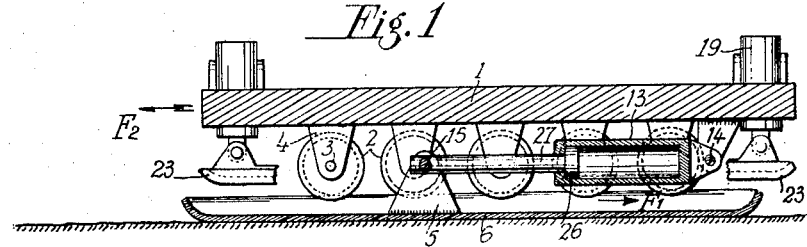
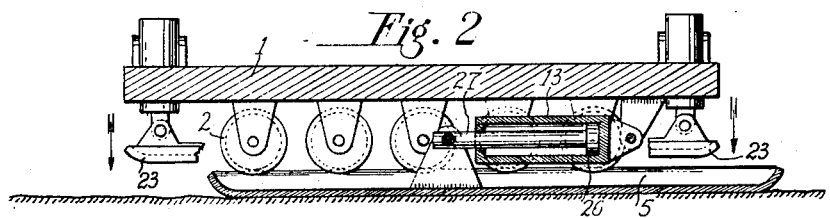
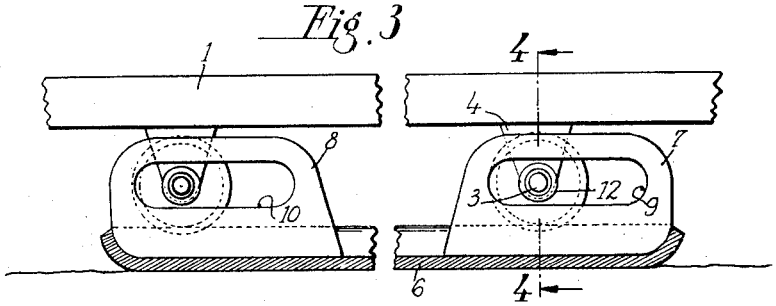
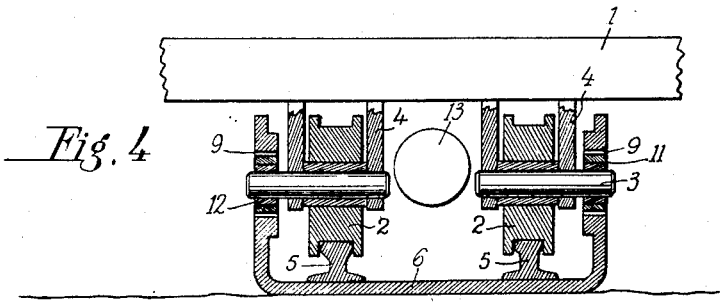
INVENTOR:
HENRI LÉON GEORGES RICOUARD
By
Richardson, David and Nerdon
Att'ys

INVENTOR:
HENRI LÉON GEORGES RICOUARD

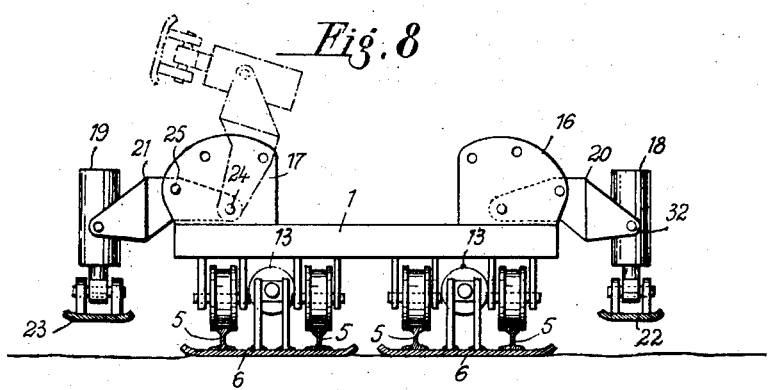
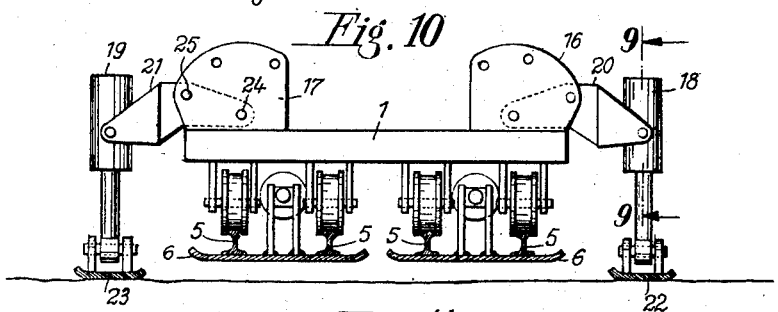
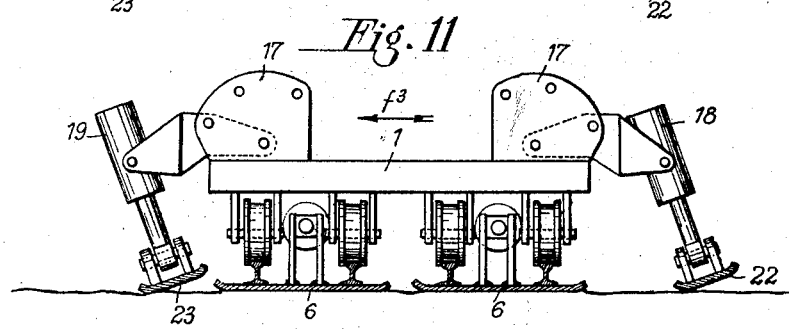
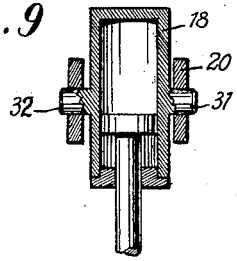

Nov. 24, 1959   H. L. G. RICOUARD   2,914,127
APPARATUS FOR WALKING HEAVY EQUIPMENT
Filed Aug. 8, 1955   7 Sheets-Sheet 4

INVENTOR:
HENRI LÉON GEORGES RICOUARD
By
Richardson, David and Nordon
Atty's

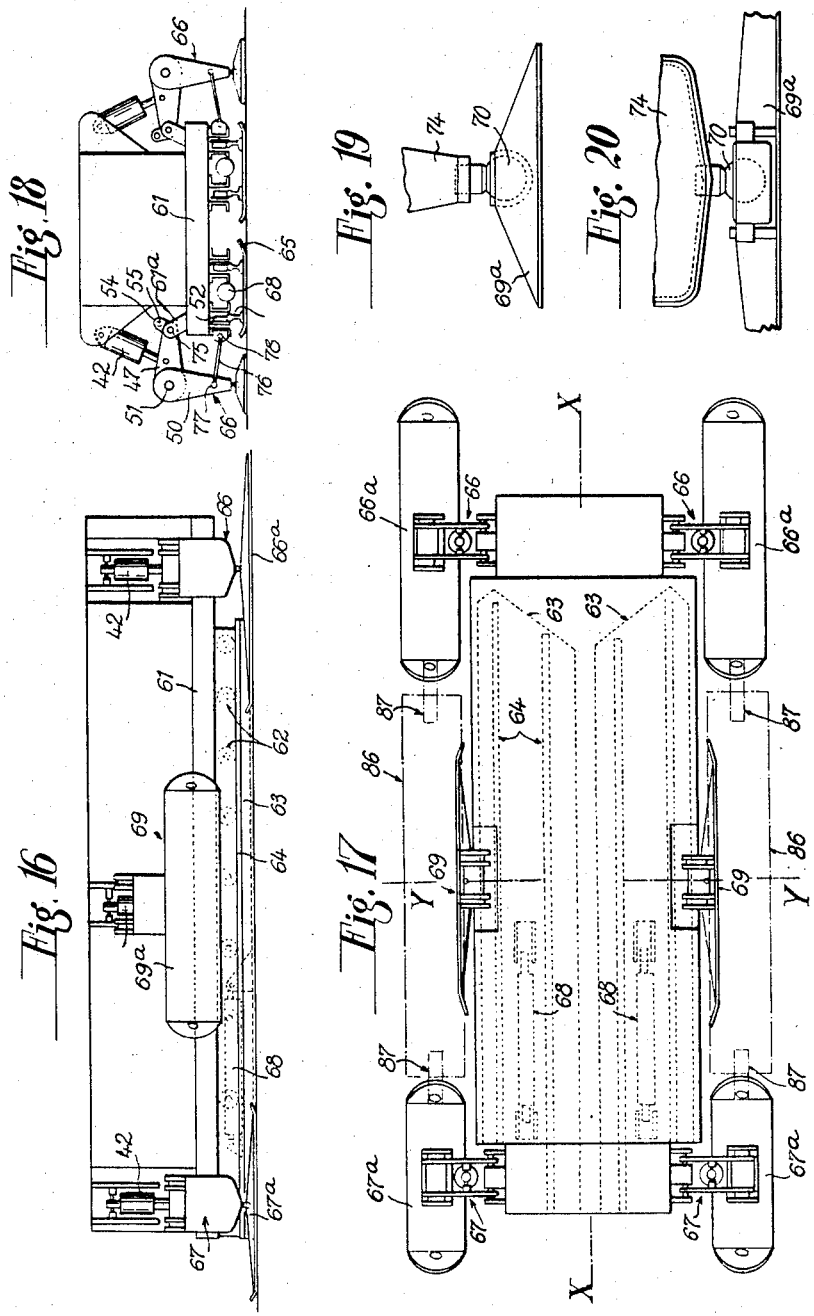

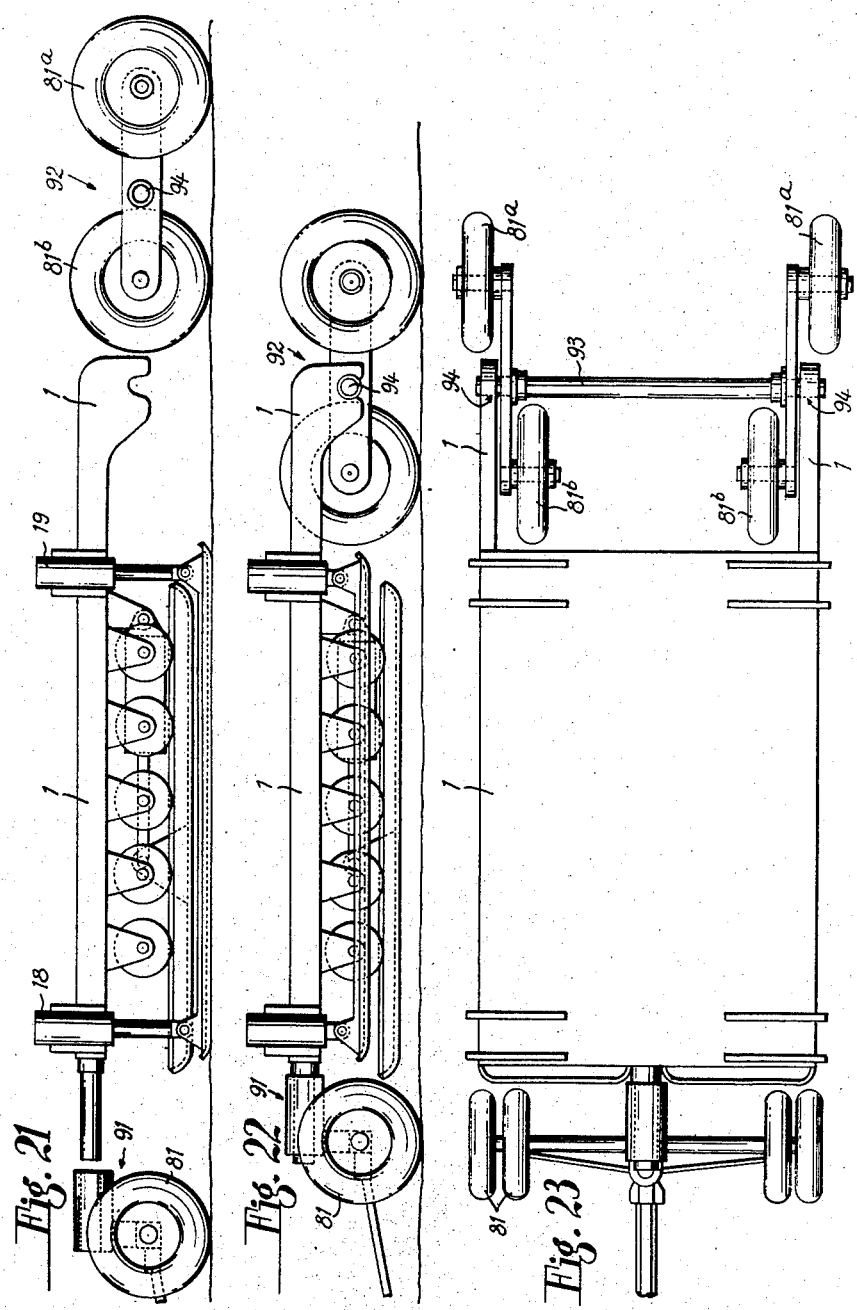

Nov. 24, 1959 H. L. G. RICOUARD 2,914,127
APPARATUS FOR WALKING HEAVY EQUIPMENT
Filed Aug. 8, 1955 7 Sheets-Sheet 7

INVENTOR:
HENRI LEON GEORGES RICOUARD
BY
Richardson, David and Nordon
Att'ys

United States Patent Office 2,914,127
Patented Nov. 24, 1959

2,914,127

APPARATUS FOR WALKING HEAVY EQUIPMENT

Henri Leon Georges Ricouard, Enghien-Les-Bains, France, assignor to Societe d'Exploitation de Procedes Mecaniques Mecaprodex, Casablanca, French Morocco, a French body corporate Application August 8, 1955, Serial No. 527,010

Claims priority, application France August 9, 1954

4 Claims. (Cl. 180—8)

The present invention relates to a mobile platform for supporting heavy equipment such as cranes, pile-drivers, power shovels and the like. The platform is movable both longitudinally and laterally over soft ground, the load being supported by means of power-actuated ground-engaging members which distribute the total load uniformly over a large area so that the maximum pressure per unit of area which is applied to the ground at any point is kept to a minimum. The ground-engaging members are actuated in a step-by-step manner by power operated means such as hydraulic cylinders or jacks.

Another object is to provide a machine which is capable of, alternatively, rolling on runways slidably connected to the chassis of this machine, or of being raised by raising devices such as hydraulic jacks connected to the chassis and to supporting pads.

A further object is to provide a machine which may be moved in any direction relative to the ground.

Yet another object is to provide a machine in which the necessary operations for moving the machine relative to its runways, and raising the machine on its supporting pads are controlled by separate hydraulic jacks and may be effected in succession, in suitable order, preferably automatically.

Again another object is to provide a machine that is capable of effecting, even on exceptionally poor grounds and with heavy loads, certain special movements such as a rotation with respect to itself, a rotation about a lateral support point, a sidewise movement (sliding).

A further object is to provide a machine that may be supported by a carriage having tires for the purpose of transport on roads.

Yet a further object is to provide a machine on which the raising devices are pivoted or linked to the chassis so as to be capable of being retracted or folded to decrease the width of the machine during its transport on roads, and to render the machine capable of effecting said special movements.

Further features and advantages of the invention will be apparent from the ensuing description with reference to the accompanying drawings, in which:

Fig. 1 is a diagammatic side elevational partly sectional of a machine embodying the invention the movements of which are obtained by hydraulic means, the raising devices having been removed in the interests of clarity;

Fig. 2 is a view similar to Fig. 1 of the same machine after the chassis has been moved relative to the runways;

Fig. 3 is a side view of the runway showing means of connecting the runway to the chassis of the machine;

Fig. 4 is a sectional view taken along line 4—4 of Fig. 3;

Fig. 8 is an end view of a modification of the invention;

Fig. 9 is a sectional view taken along line 9—9 of Fig. 10, of a device for attaching one of the rams;

Figs. 10 and 11 are views similar to Fig. 8 and show the same machine in other positions;

Figs. 16, 17 and 18 are elevational, plan and end views respectively of a modification of the machine, comprising auxiliary raising devices;

Figs. 19 and 20 are fragmentary views, in directions perpendicular to one another, of a shoe of a raising device pivotably mounted on a ball;

Fig. 21 is an elevational view of the machine raised by the raising rams to a suitable height for assembling sets of wheels provided with pneumatic tires for transport on roads;

Fig. 22 is a view similar to Fig. 21, the machine being provided with two sets of wheels and being in its position for transport;

Fig. 23 is a plan view corresponding to Fig. 22, a part of the machine having been broken away;

Figure 5:
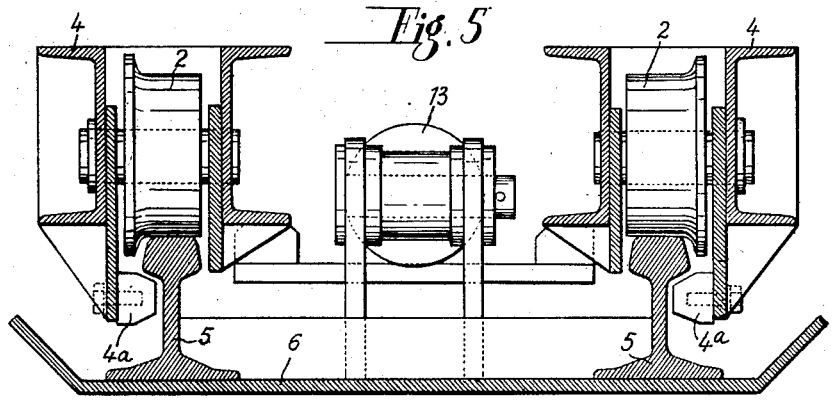
Fig. 5 is a cross-sectional view of a modification of the means of connecting the runway to the chassis of the machine.

In the embodiment shown in particular in Figs. 1 and 2, the machine comprises a chassis 1, provided with a number of rollers 2 rotatably mounted on spindles 3 (Fig. 3) fixed to the chassis by supports 4. These rollers roll along a runway comprising a rail 5 rigid with a base-plate 6 forming a support face capable of supporting the machine. The latter may comprise four rows of rollers 2 (see Fig. 8) and four rails 5 interconnected in pairs by two base-plates 6. Each base-plate 6 is connected to the chassis (Fig. 3) by supports 7 and 8 (not shown in Figs. 1 and 2) disposed at each end of the base-plate in regions situated in the vicinity of the ends of the chassis. The supports 7 and 8 are formed by plates provided with elongated apertures or slots 9 and 10 in which rollers 11 and 12 (Figs. 3 and 4), carried by the spindles 3 of the rollers 2, are capable of moving. When the chassis is raised the runway is therefore carried by the chassis but is capable of rolling thereunder. The lengths of the slots 9 and 10 correspond to the travel of the chassis relative to the runway (or the travel of the runway relative to the chassis). A hydraulic jack 13 is secured to the chassis 1 at a point 14 (Fig. 1) and, furthermore, to the base-plate 6 at a point 15. This jack is shown in axial section in Figs. 1 and 2.

According to a modification (Fig. 5) of the machine, each runway is slidably supported by blocks or bars 4a which are fixed to the supports 4 and bear under the upper flanges of the rails 5.

The chassis 1 carries, furthermore, at the ends of its side walls, supports 16 and 17 (Fig. 8) which carry raising jacks 18 and 19 through the medium of arms 20 and 21, the rods of the jacks 18 and 19 being connected to supporting pads or shoes 22 and 23 disposed alongside the chassis. The arms 20 and 21 may be movably mounted on the supports 16 and 17, for example by means of pins 24 and 25 and may be raised or retracted for the purpose of reducing the width of the machine, for example when on the road. The jacks 18 and 19 then adopt the position shown in dot-dash line at the left of Fig. 8.

Figure 6:
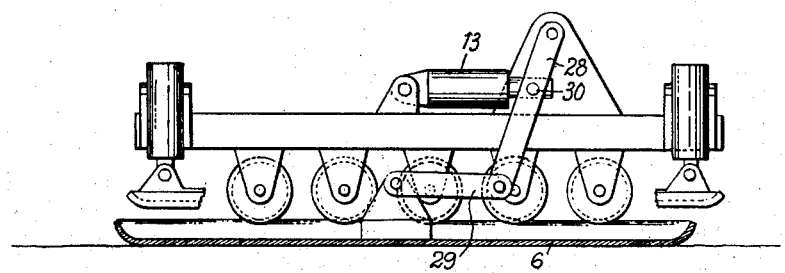
Figs. 6 and 7 are side views of a modification of the invention in two positions in the course of a displacement operation.
Figure 7:
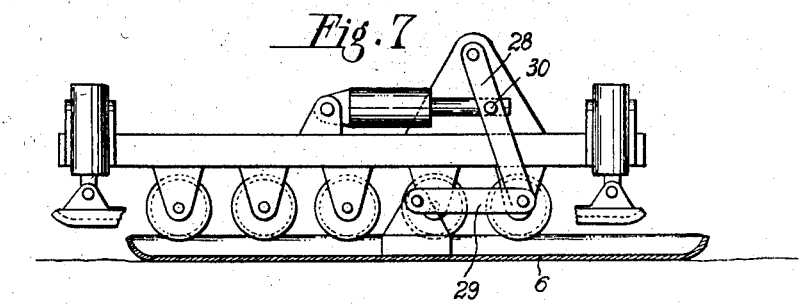

In a modification shown in Figs. 6 and 7, the jack 13, instead of acting directly on the base-plates 6, shifts the latter through the medium of articulated links 28 and 29. This permits use of a jack 13 which has a shorter travel; furthermore, by changing the position of the pivotal connection 30 of the jack on the link 28, it is possible to adjust the extent of the relative movements between the runways and chassis, which may be advantageous in certain cases.

The raising jacks, such as 18, 19 (Fig. 8), may be rotatably mounted on the arm 20, 21 by means of journals 31, 32 (Fig. 9). This enables them to be folded or retracted to their inoperative position (Fig. 8), or brought to their vertical raising position (Fig. 10) or an inclined position (Fig. 11), the latter position permitting the sliding movement described hereinbelow.

The machine normally operates, that is, moves in the longitudinal direction, in the following manner:

The machine rests on the rails 5 and base-plates 6 (Fig. 1) and the jack 13, or each jack 13, is supplied with pressure in such manner that its piston 26 tends to move in the direction of $F^1$. The rod 27 of the piston 26 is connected to the base-plates 6 at 15, and it is the body of the jack 13, fixed to the chassis 1 at 14, which is moved, the chassis travelling with this body in the direction of arrow $F^2$ by rolling along the runways.

The chassis 1 adopts the position shown in Fig. 2.

The raising jacks may now be operated so that the shoes 22, 23 come into contact with the ground and raise the chassis. The jack 13 is then operated in such manner that the runway slides under the chassis in the direction of arrow $F^2$, the edges of the slots 9 and 10 (Fig. 3) running along the rollers 11, 12. When the runway reaches the end of its travel the chassis is lowered by acting on the jacks 18, 19 until the runways once again rest on the ground. The chassis is once more rolled along the runway in actuating the jack 13, and the same sequence of operations may be repeated as long as required.

All these operations may be effected automatically or manually and separately.

The machine described hereinabove may also effect various movements, such as rotational or transverse sliding movements. However, in order to facilitate more particularly these movements, there may be provided further means to be described hereinunder.

Figure 12:
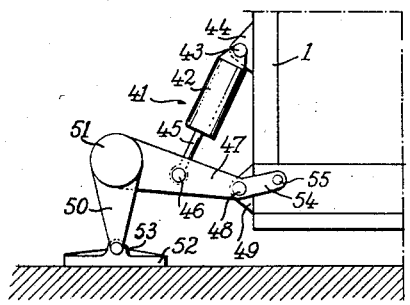
Fig. 12 is an elevational view of a modification of the raising device.

In the embodiment shown in Fig. 12, each of the raising devices 41 is connected to the chassis 1 at 43 (Fig. 12) by, for example, a bracket 44. The rod 45 of this jack is pivoted to an arm 47 at 46 which is itself pivoted at 48 to the chassis 1, for example by means of a bracket 49 disposed below the bracket 44. This arm 47 carries a thrust link 50 pivoted to the arm at 51 and pivoted at its other end to a supporting pad or shoe 52 by means of a ball-and-socket joint 53.

Figure 13:
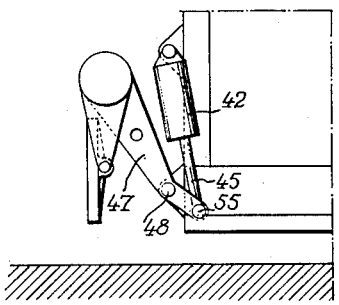
Fig. 13 is an elevational view of the device shown in Fig. 12 in its folded or retracted position.

The arm extends beyond its pivotal connection 48 at 54 and is provided with a hole 55 adapted to receive the end of the rod 45 of the jack 42. When the rod 45 is connected at 55 to the extension 54 and the jack operates in its normal direction, that is, in the direction to extend the jack, the arm 47, link 50 and shoe 52 (Fig. 13) are retracted so as to reduce the width of the machine, for example when transporting the latter.

The machine comprises four devices, similar to the device 42 to 55 described hereinabove, disposed in the vicinity of the four corners of the chassis, the four shoes 52 being independent of one another.

According to a modification, an additional jack 56 (Fig. 14) is connected at 57 to the chassis 1 and, furthermore, at 58 to the link 50 for the purpose of moving the shoe 52 away from or toward the chassis before the jack 42 enters into action which facilitates and ensures a precise control of the lateral sliding of the machine to be described hereinbelow.

Figure 15:
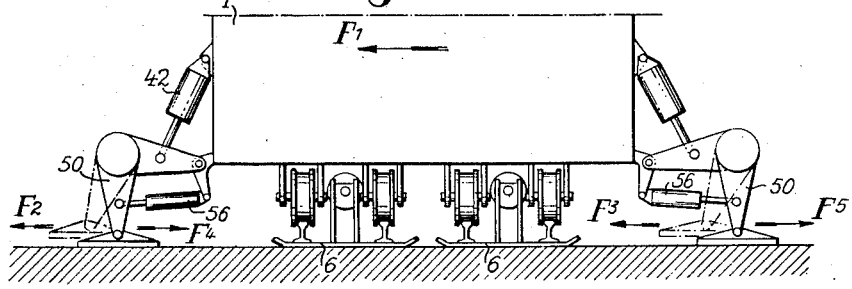
Fig. 15 is a diagrammatic front or rear elevational view of the chassis of the machine provided with raising devices of the type shown in Fig. 14.

A machine provided with these raising devices is shown in Fig. 15.

The embodiment shown in Figs. 16 to 18 comprises a chassis 61 which is capable of running on rollers 62 along runways 63 comprising rails 64 and base-plates 65. The machine also comprises four raising devices 66—66 and 67—67, of the type shown in Fig. 12, disposed adjacent the four corners of the machine. The shoes have preferably curved ends and a supporting area suitable for the load they are intended to support. In Fig. 17 there are shown by a way of example two front shoes 66a and two rear shoes 67a, the latter being shorter than the front shoes.

The runways are connected to the chassis by jacks 68.

The machine further comprises at least one auxiliary raising device 69 attached to the side of the machine in the plane YY which contains the centre of gravity of the machine and is perpendicular to the longitudinal axis of symmetry XX of the latter. This auxiliary raising device may be identical to one of the types of raising devices described hereinabove and, in particular, may be identical to the raising devices 66 or 67 mounted on the same chassis.

Figs. 16 and 17 show two auxiliary raising devices 69, similar to the devices 66 and 67, these auxiliary devices being shown folded back or retracted to their inoperative positions, whereas the normal raising devices 66—66 and 67—67 are in their position of use.

Figure 29:
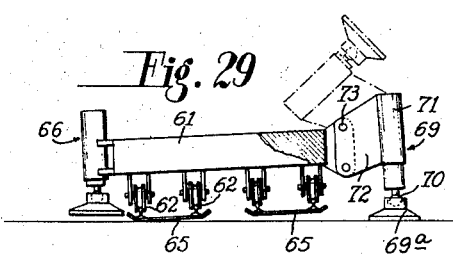
Fig. 29 is an end elevational view of the machine in position for effecting a rotation about a lateral support point.

An auxiliary raising device 69 may comprise a shoe 69a connected by a ball-and-socket joint 70 to the end of a jack 71 which is connected to the chassis by means of a support 72 pivoted at 73 to the chassis so as to permit the device to be retracted to its inoperative position, as shown in dot-dash line in Fig. 29.

Alternatively, this auxiliary raising device may be substantially identical to the devices 66 or 67 shown in Fig. 18 (see also Fig. 12), that is, it may comprise, for example, a horizontal arm and a vertical link, the jack acting on the horizontal arm; the vertical link 74 (Figs. 19 and 20) is in this case pivoted to the shoe 69a by means of a ball-and-socket joint.

This ball-and-socket mounting is also applicable to the normal raising devices such as 66—66 and 67—67 (Figs. 16 to 18).

In each normal raising device, such as 66 (Fig. 18), the vertical link 50 is connected at a first point 75 to the chassis (or a member 61a fixed to the chassis 1) by the arm 47, which is substantially horizontal and pivoted at 51 to said link. Further, this link 50 may be connected to the chassis by a connecting rod 76 which is pivoted to the link 50 at 77 below the pivotal connection 51 and bears on the chassis at 78 or is pivoted thereto in a removable manner.

The jacks controlling the movement of the chassis along the runways when the latter rest on the ground may be operated independently of one another in both directions, one of the jacks being therefore operated in the opposite direction to the other, this manner of actuating the jacks being obtained by any suitable device well known in the art.

Figure 24:
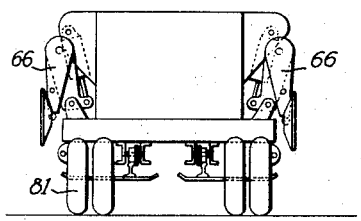
Fig. 24 is an end elevational view of the machine in condition for transport, the raising devices having been retracted.

For transport on the road, the machine may be raised by the normal raising jacks such as 18 and 19 (Fig. 21) and wheels 81 are attached to the chassis. These wheels may be, for example, those of a front carriage of the type described in the French Patent No. 1,007,085 filed on February 23, 1948. The rods of the jacks 18 and 19 are thereafter retracted and the apparatus is ready for towing (Figs. 22, 23 and 24). The reverse operation is effected when the machine reaches the site.

Preferably, these wheels form, in addition to the front steering carriage 91 of the above-mentioned type, a supporting carriage 92 comprising a central axle 93 and two sets of wheels, the two rear wheels having a wider track than the two front wheels 81b of this carriage so that the tracks the wheels leave in the ground do not coincide.

The chassis 1 of the machine rests on the ends 94 of the central axle 93 so that the carriage may pivot freely in accordance with variations in the ground surface.

This machine may be used not only for transporting heavy equipment but also for apparatus adapted to exert a horizontal penetrating force or thrust (for example, a bulldozer, scraper, shoveller or the like) requiring great force at very low velocity in a direction parallel to the planes of support of the machine on the ground. In this case the anchorage of the base-plates to the ground is obtained by the adherence of devices such as hollow shoes forming spade elements, inclined ribs and the like, which suitably distribute over the ground the substantially horizontal forces to which the base-plates are subjected during the operation of the machine.

Figure 25:
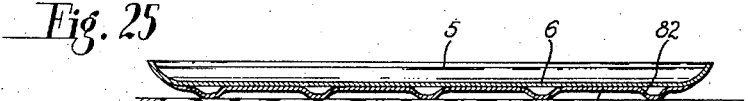
Figs. 25 and 26 are sectional and plan views respectively of a first modification of the runway base-plate.
Figure 26:

As shown in Figs. 25 and 26, the base-plates 6 supporting the rails 5 are furnished with a plate 82 in which are formed recesses 83, whereby suction adherence to the ground is increased.

Figure 27:
Figs. 27 and 28 are sectional and plan views respectively of a second modification of the runway base-plate.
Figure 28:
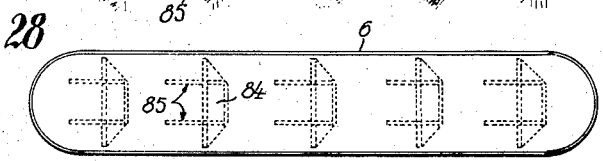

The base-plates 6 shown in Figs. 27 and 28 are provided with spades 84 provided, for example, with ribs 85. These spades are inclined in such manner that they are forced into the ground as a result of the reaction of the chassis-moving jacks when the latter act on the base-plates 6, the forces on the base-plates being in the direction of the arrow.

Any other adherence-improving device may be provided, for example diamond-pointed teeth which are inclined or vertical, or teeth which sink into the ground and thus ensure a good adherence of the base plates to the ground, these spades or teeth having any suitable shape to ensure a good anchorage.

Owing to the fact that the machine may be raised a great height off the ground along which it moves, the adherence-providing devices, whatever type they may be and whatever their area or length, may always be disengaged from the ground and therefore do not interfere with the movements of the machine.

On each side of the machine, the front shoes 66a and rear shoes 67a may be interconnected by a removable shoe 86 (Fig. 17) which permits increasing the bearing surface of the machine on the ground, especially in the case of ground having poor supporting qualities, these two shoes 86 being preferably articulated or hinged at at least their ends 87.

The machine provided with these various accessories may effect, in addition to the above-described longitudinal movement by stages in particular the following movements:

Rotation about itself or on a small radius

Modification of the orientation of the machine on the ground in the course of its longitudinal movement may be obtained by reversing the movement of the jacks individually controlling the runways. In this way the machine is rotated substantially with respect to itself.

By actuating a single jack a greater turning radius is obtained.

Rotation about a lateral support point

The machine may be raised on one of its raising devices and one runway actuated. Preferably, the machine is raised on one of the auxiliary raising devices 69, as shown in Fig. 29 (in which the right, front part of the machine carrying the normal raising device has been removed so as to show the device 69 in operative position). By actuating the jack 13 of the base-plate 65 the most distant from this device 69, the machine pivots about the ball-and-socket joint of the device 69 in either direction depending on the direction in which the jack 13 acts on the base-plate 65, the latter sliding or skidding slightly during this movement.

When the chassis has reached the end of its travel along base-plate 65, the latter is raised off the ground by raising the machine on its raising devices 66, 67. The base-plate 65 is moved a further stage forward, the machine is lowered once more onto the base-plate and the above-described operation is repeated so as to obtain a further partial rotation of the machine.

Lateral sliding movement of the machine

If it is desired to move the machine shown in Fig. 1 sidewise, the shoes are lowered onto the ground by means of the jacks 18, 19 and the chassis is raised. One of the jacks then receives further pressure which causes movement of the chassis 1, for example in the direction of arrow $f^3$ (Fig. 11). The movement continues until the jacks have reached the end of their travel, these jacks pivoting in the arms 20 and 21. The rods of the jacks 18 and 19 are then retracted (Fig. 8) until they reach their initial position, and the operation recommences.

Figure 14:
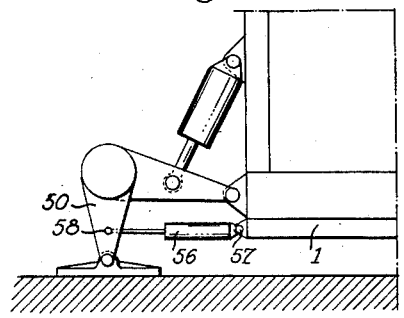
Fig. 14 is a view similar to Fig. 12, showing a further modification of the raising device.

The lateral sliding or skidding may be effected with precision with a machine furnished with devices having two jacks, as shown in Fig. 14 and, in more detail, Fig. 15. In this arrangement, in order to slide the machine in the direction of the arrow $F^1$, the machine resting on its runways 6, the shoes are moved in the direction of arrows $F^2$ and $F^3$ by the jacks 42. When the shoes are in the position shown in dot-dash line in Fig. 15, the jacks 42 are brought into action so as to raise the machine and, in acting on the jacks 56 in suitable manner, i.e. the jack 56 at the left in Fig. 15 being so actuated as to retract its rod in the direction of arrow $F^4$ and the jack 56 at the right of Fig. 15 exerting on the link 50 a force in the direction of arrow $F^5$, the machine supported by its shoes is moved laterally relative to the latter in the direction of arrow $F^1$.

The machine may be thereafter lowered onto its runways 6 and the operation repeated as many times as is necessary to obtain the desired displacement.

Figure 30:
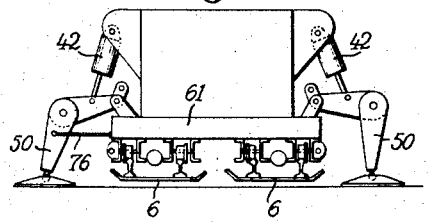
Figs. 30 and 31 are end elevational views of the machine in the course of the two stages of a lateral sliding movement.
Figure 31:
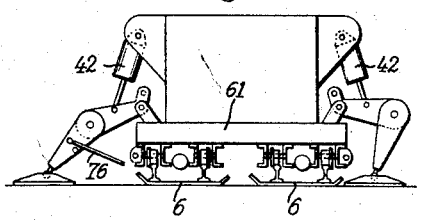

The raising device having a single jack and link, shown in particular in Fig. 18, is cheaper but also permits effecting a sliding movement as shown in Figs. 30 and 31.

Assuming that the machine is raised by its devices 66, 67 and must be slid or skidded to the right as shown in Fig. 30, the connecting rod 76 is so disposed that the angle of the link 50 obtained before the machine is raised is such that in the course of the raising of the machine the load supported by the pivotal connection of the link 50 applies a torque tending to urge the machine to the right as seen in Fig. 30. The opposite link 50 is placed in a substantially vertical position. The right connecting rod 76 is withdrawn and when the machine is raised by the jacks 42 the machine slides or skids to the right since nothing opposes the pivotal movement of the right link 50. This movement continues until the base-plates resume contact with the ground (Fig. 10). In the course of this movement, the contact between the connecting rod 76 and the chassis is broken. The shoes are returned to their normal position for the purpose of effecting a further lateral movement or step and this operation is repeated as many times as is necessary.

Although various embodiments of the invention have been described hereinabove, many modifications and changes may be made therein without departing from the scope of the invention as defined in the appended claims.

Thus, the hydraulic jacks may be replaced by suitable mechanical or electrical devices which permit the same result to be obtained.

Having now described my invention what I claim as new and desire to secure by Letters Patent is:

1. A mobile platform comprising, in combination, a main load-carrying platform, a longitudinally extending base member disposed beneath said platform and connected thereto to be raised and lowered therewith, said platform being mounted for free longitudinal movement along said base member, a plurality of vertically extending lifting jacks disposed at opposite sides of said platform, means connecting said jacks to said platform for free pivotal movement in both directions from the vertical about axes parallel to the longitudinal axis of said platform, power operated means for reciprocating said base member with respect to said platform, and means for actuating said lifting jacks including means for actuating the lifting jacks at one side of said platform independently of the jacks at the other side thereof.

2. A mobile platform comprising, in combination, a main load-carrying platform, a pair of longitudinally extending base members symmetrically disposed beneath said platform and connected thereto to be raised and lowered therewith, said platform being mounted for free longitudinal movement simultaneously along both of said base members, a plurality of vertically extending lifting jacks disposed at opposite sides of said platform, means connecting said jacks to said platform for free pivotal movement in both directions from the vertical about axes parallel to the longitudinal axis of said platform, individual power operated means for reciprocating each of said base members independently with respect to said platform, and means for actuating the lifting jacks at one side of said platform independently of the jacks at the other side thereof.

3. A mobile platform comprising, in combination, a main load-carrying platform, at least one longitudinally reciprocable base member disposed beneath said platform and connected thereto to be raised and lowered therewith, said platform being mounted for free longitudinal movement along said base member, a plurality of vertically extending lifting jacks disposed at opposite sides of said platform, each of said jacks comprising a power operated thrust member, a vertically depending leg member pivoted at its upper end portion for free movement in both directions from the vertical about an axis parallel to the longitudinal axis of said platform, said leg member being vertically movable by said thrust member, and a ground engaging member articulated to the lower end portion of said leg member, means connecting said jacks to said platform for selectively raising and lowering the same, power operated means for reciprocating said base member with respect to said platform, and means for actuating said thrust members of said lifting jacks including means for actuating the thrust members of the lifting jacks at one side of said platform independently of those of the jacks at the other side thereof.

4. A mobile platform comprising, in combination, a main load-carrying platform, at least one longitudinally reciprocable base member disposed beneath said platform and connected thereto to be raised and lowered therewith, said platform being mounted for free longitudinal movement along said base member, a plurality of vertically extending lifting jacks disposed at opposite sides of said platform, each of said jacks comprising a power operated thrust member, a vertically depending leg member pivoted at its upper end portion for free movement in both directions from the vertical about an axis parallel to the longitudinal axis of said platform, said leg member being vertically movable by said thrust member, a ground engaging member, and a ball and socket connection between the lower end portion of said leg member and said ground engaging member, means connecting said jacks to said platform for selectively raising and lowering the same, power operated means for reciprocating said base member with respect to said platform, and means for actuating said thrust members of said lifting jacks including means for actuating the thrust members of the lifting jacks at one side of said platform independently of those of the jacks at the other side thereof.

References Cited in the file of this patent

UNITED STATES PATENTS

| | | |
|---|---|---|
| 1,326,805 | Tibbits | Dec. 30, 1919 |
| 1,615,055 | Turner | Jan. 18, 1927 |
| 1,627,249 | Page | May 3, 1927 |
| 2,132,184 | Poche | Oct. 4, 1938 |
| 2,261,160 | Joy | Nov. 4, 1941 |
| 2,370,661 | Hayes | Mar. 6, 1945 |
| 2,400,803 | Barnhart | May 21, 1946 |
| 2,452,632 | Cameron | Nov. 2, 1948 |
| 2,663,433 | Le Clair | Dec. 22, 1953 |